US012482978B2

(12) United States Patent
Miyamura et al.

(10) Patent No.: US 12,482,978 B2
(45) Date of Patent: Nov. 25, 2025

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 295 days.

(21) Appl. No.: 18/275,175

(22) PCT Filed: Jan. 31, 2022

(86) PCT No.: PCT/JP2022/003475
§ 371 (c)(1),
(2) Date: Jul. 31, 2023

(87) PCT Pub. No.: WO2022/176580
PCT Pub. Date: Aug. 25, 2022

(65) Prior Publication Data
US 2024/0313453 A1 Sep. 19, 2024

(30) Foreign Application Priority Data
Feb. 19, 2021 (JP) ................................ 2021-024937

(51) Int. Cl.
*H01R 13/11* (2006.01)
*H01R 12/75* (2011.01)

(52) U.S. Cl.
CPC ............ *H01R 13/11* (2013.01); *H01R 12/75* (2013.01)

(58) Field of Classification Search
CPC ................................ H01R 13/11; H01R 12/75
(Continued)

(56) References Cited

U.S. PATENT DOCUMENTS 5,899,775 A * 5/1999 Davis .................. H01R 13/428
439/852
5,951,336 A * 9/1999 Seko ................... H01R 13/432
439/748
(Continued)

FOREIGN PATENT DOCUMENTS

JP H09-232021 A 9/1997
JP 2001-039239 A 2/2001
(Continued)

*Primary Examiner* — Harshad C Patel
(74) *Attorney, Agent, or Firm* — Venjuris, P.C.

(57) ABSTRACT

It is aimed to achieve a height reduction. A connector (F) is provided with a female terminal fitting (30) and a housing (10). The female terminal fitting (30) includes a tab inserting portion (35), into which a tab (53) of a male terminal fitting (52) is inserted, and a first resilient contact piece (37) exposed on an outer surface of the tab inserting portion (35) and configured to resiliently contact the tab (53). The housing (10) includes a terminal accommodation chamber (13) for accommodating the tab inserting portion (35). A deflection allowance space (22) for allowing a resilient displacement of the resilient contact piece (37) is formed within a thickness range of an upper wall portion (16) defining the terminal accommodation chamber (13), out of the housing (10).

5 Claims, 9 Drawing Sheets

(58) Field of Classification Search
USPC .......................................................... 439/816
See application file for complete search history.

(56) References Cited

U.S. PATENT DOCUMENTS

| | | | | |
|---|---|---|---|---|
| 6,109,981 | A * | 8/2000 | Jin-ichi .................. | H01R 13/40 439/869 |
| 8,944,852 | B2 * | 2/2015 | Fukushi ............... | H01R 13/112 439/626 |
| 10,122,108 | B2 * | 11/2018 | Bhagyanathan Sathianathan ....... | H01R 13/113 |
| 2002/0013104 | A1 * | 1/2002 | Tanaka ............... | H01R 13/4362 439/752 |
| 2014/0242824 | A1 | 8/2014 | Karadimas et al. | |
| 2015/0111425 | A1 * | 4/2015 | Kao ................... | H01R 13/6597 439/607.01 |
| 2015/0111428 | A1 * | 4/2015 | Kao ................... | H01R 13/6581 439/607.02 |
| 2015/0111430 | A1 * | 4/2015 | Kao ................... | H01R 13/6582 439/607.55 |
| 2018/0212340 | A1 * | 7/2018 | Bhagyanathan-Sathlanatha ......... | H01R 13/24 |
| 2020/0185843 | A1 * | 6/2020 | Miyamura ............. | H01R 13/41 |
| 2021/0075137 | A1 * | 3/2021 | Hung ..................... | H01R 13/11 |

FOREIGN PATENT DOCUMENTS

| | | |
|---|---|---|
| JP | 2014-135129 A | 7/2014 |
| JP | 2020-135998 A | 8/2020 |

* cited by examiner

CONNECTOR

CROSS REFERENCE TO RELATED APPLICATIONS

This application is a national phase of PCT application No. PCT/JP2022/003475, filed on 31 Jan. 2022, which claims priority from Japanese patent application No. 2021-024937, filed on 19 Feb. 2021, all of which are incorporated herein by reference.

TECHNICAL FIELD

The present disclosure relates to a connector.

BACKGROUND

Patent Document 1 discloses a connector in which a terminal fitting is accommodated in a block body. The terminal fitting includes a component terminal connecting portion in the form of a rectangular tube, into which a projecting terminal is inserted, and a resilient contact piece accommodated in the component terminal connecting portion. If the projecting terminal is inserted into the component terminal connecting portion, the resilient contact piece is pressed by the projecting terminal, thereby being resiliently deformed and resiliently contacting the projecting terminal.

PRIOR ART DOCUMENT

Patent Document

Patent Document 1: JP 2014-135129 A

SUMMARY OF THE INVENTION

Problems to be Solved

A space for accommodating the resilient contact piece and a space for resiliently deforming the resilient contact piece are necessary in the component terminal connecting portion of this terminal fitting. Thus, it is difficult to reduce a height in a resilient displacement direction of the resilient contact piece.

A connector of the present disclosure was completed on the basis of the above situation and aims to achieve a height reduction.

Means to Solve the Problem

The present disclosure is directed to a connector with a female terminal fitting and a housing, the female terminal fitting including a tab inserting portion, a tab of a male terminal fitting being inserted into the tab inserting portion, and a resilient contact piece exposed on an outer surface of the tab inserting portion, the resilient contact piece resiliently contacting the tab, the housing including a terminal accommodation chamber for accommodating the tab inserting portion, and a deflection allowance space for allowing a resilient displacement of the resilient contact piece being formed within a thickness range of a wall portion defining the terminal accommodation chamber, out of the housing.

Effect of the Invention

According to the present disclosure, a height reduction can be achieved.

DETAILED DESCRIPTION TO EXECUTE THE INVENTION

Description of Embodiments of Present Disclosure

Figure 1:
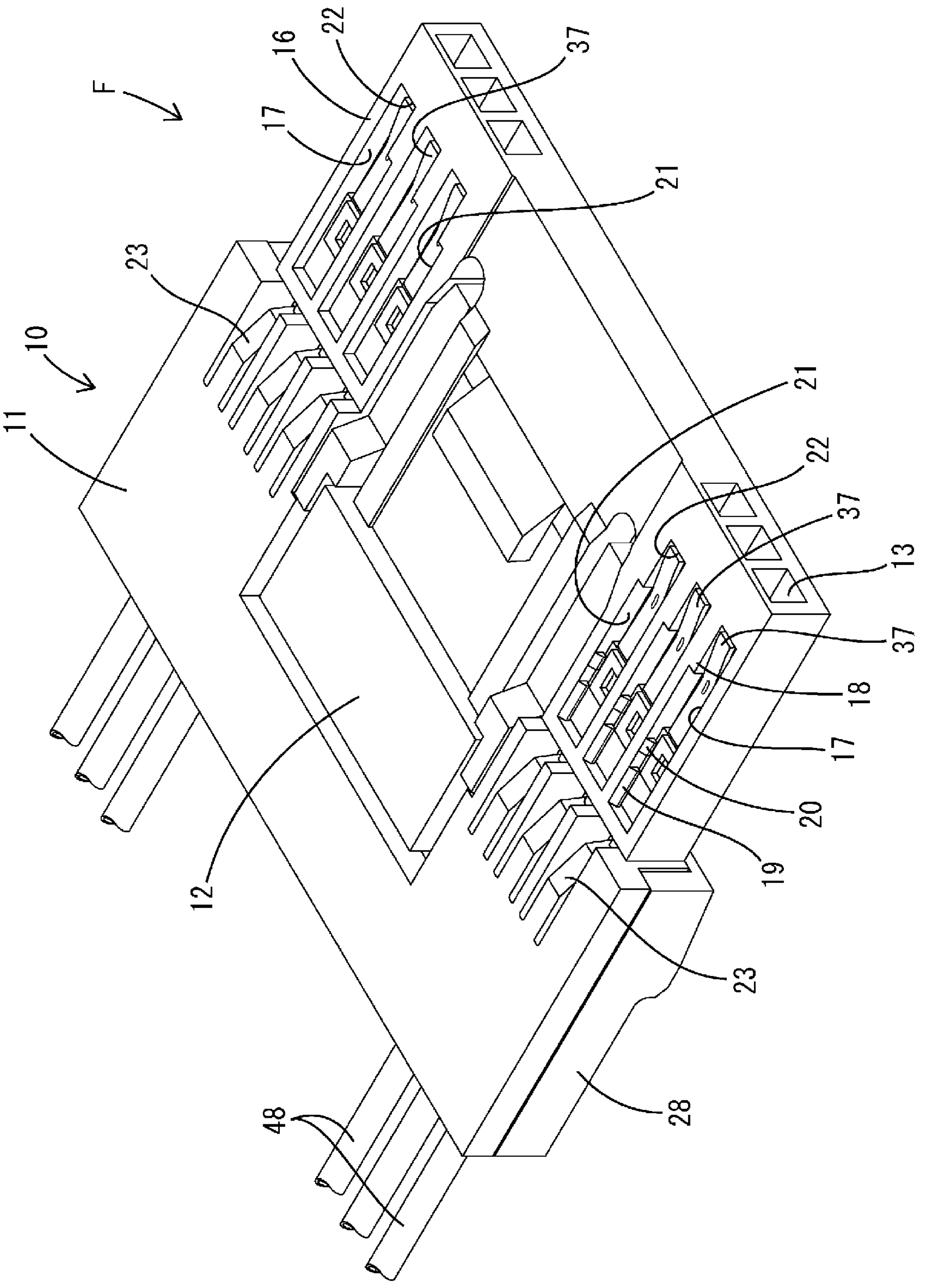
FIG. 1 is a perspective view of a connector of one embodiment.

First, embodiments of the present disclosure are listed and described.

(1) The connector of the present disclosure is provided with a female terminal fitting and a housing, the female terminal fitting including a tab inserting portion, a tab of a male terminal fitting being inserted into the tab inserting portion, and a resilient contact piece exposed on an outer surface of the tab inserting portion, the resilient contact piece resiliently contacting the tab, the housing including a terminal accommodation chamber for accommodating the tab inserting portion, and a deflection allowance space for allowing a resilient displacement of the resilient contact piece being formed within a thickness range of a wall portion defining the terminal accommodation chamber, out of the housing. If the resilient contact piece contacts the tab to be resiliently displaced, a part of the resilient contact piece projecting outwardly of the tab inserting portion due to the resilient displacement is accommodated in the deflection allowance space. The deflection allowance space is secured within the thickness range of the wall portion constituting the terminal accommodation chamber. Therefore, the connector of the present disclosure can be reduced in height in a resilient displacement direction of the resilient contact piece as compared to the case where a dedicated space serving as the deflection allowance space is secured only inside the female terminal fitting.

(2) Preferably, a part of the resilient contact piece is accommodated in the deflection allowance space in a state where the tab is not inserted in the tab inserting portion. According to this configuration, the tab inserting portion can be reduced in height.

(3) Preferably, the deflection allowance space is open in an outer surface of the housing. According to this configuration, the housing can be reduced in height as compared to the case where the deflection allowance space is not open in the outer surface of the housing.

(4) Preferably, the female terminal fitting includes a terminal body formed with the tab inserting portion and the resilient contact piece, and the housing is formed with a first mounting opening open in an outer surface of the housing in the wall portion, the first mounting opening enabling the terminal body to enter the terminal accommodation chamber. According to this configuration, when the terminal body is mounted into the terminal accommodation chamber, the resilient contact piece projecting toward an outer surface side from the tab inserting portion needs not interfere with the housing.

(5) Preferably, in (4), the female terminal fitting includes a wire fixing member to be fixed to a front end part of a wire, the wire fixing member being mountable into a rear end part of the terminal body, and the housing is formed with a second mounting opening for enabling the wire fixing member to be inserted into the terminal accommodation chamber from behind the housing. According to this configuration, since the wire fixing member is inserted into the terminal accommodation chamber from the second mounting opening different from the first mounting opening, the size of the first mounting opening may be such that the terminal body can pass. Therefore, an opening area of the first mounting opening can be suppressed to be small.

(6) Preferably, in (5), the terminal body is formed into a rectangular tube shape by four plate portions, the wire fixing member includes a tab-like contact portion to be inserted into the terminal body, the terminal body includes a second resilient contact piece configured to resiliently contact the tab-like contact portion, and the resilient contact piece and the second resilient contact piece are individually formed in the plate portions different from each other, out of the four plate portions. According to this configuration, an entire length of the terminal body can be shortened while lengths of the resilient contact piece and the second resilient contact piece are secured as compared to the case where the resilient contact piece and the second resilient contact piece are formed in one common plate portion.

DETAILS OF EMBODIMENT OF PRESENT DISCLOSURE

Embodiment

Figure 2:
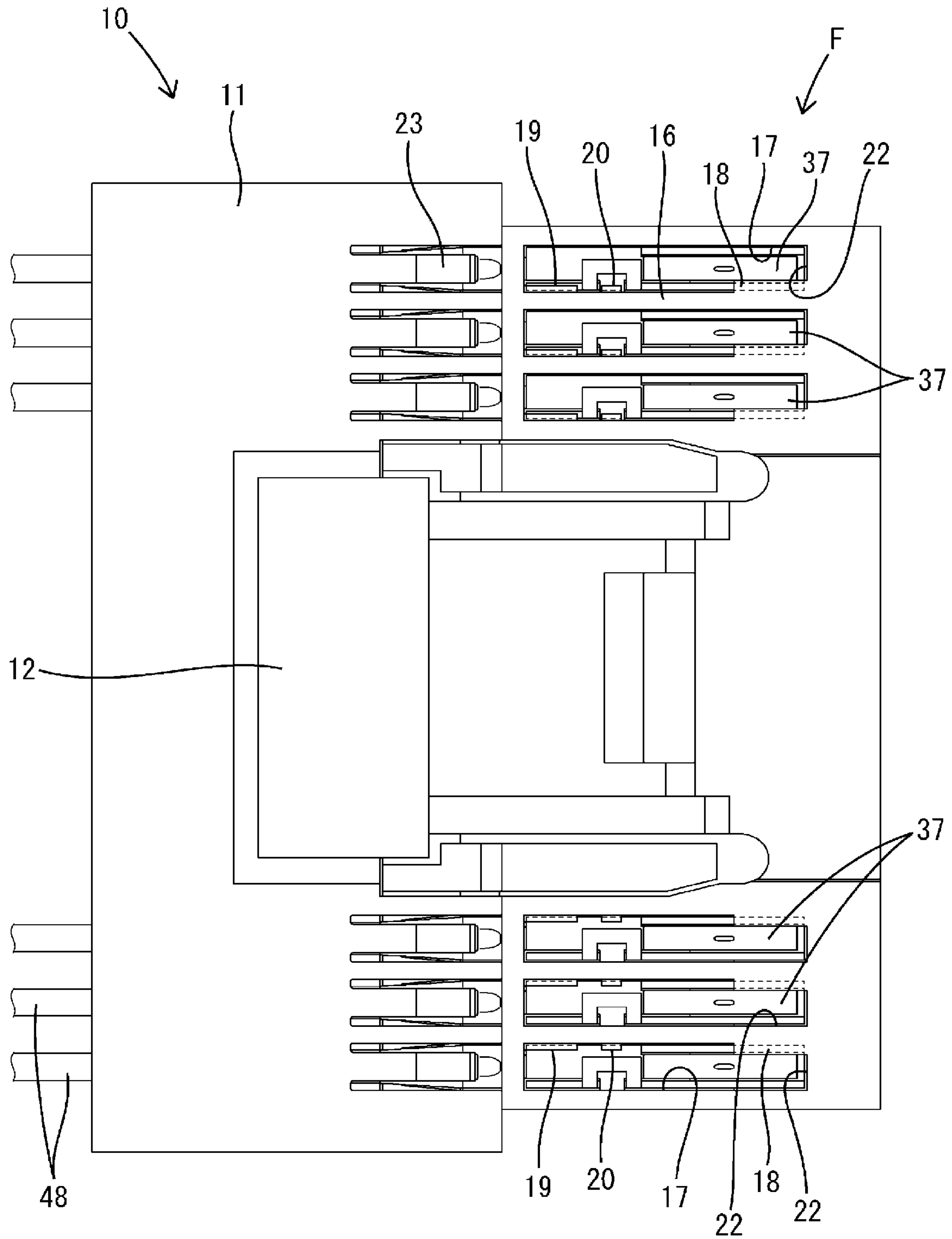
FIG. 2 is a plan view of the connector.

One specific embodiment of a connector F of the present disclosure is described with reference to FIGS. 1 to 9. Note that the present invention is not limited to these illustrations, but is represented by claims and intended to include all changes in the scope of claims and in the meaning and scope of equivalents. In this embodiment, an oblique right-lower side in FIGS. 1, 3 and 4 and a right side in FIGS. 2 and 5 to 7 are defined as a front side concerning a front-rear direction. Upper and lower sides shown in FIGS. 1 and 3 to 9 are directly defined as upper and lower sides concerning a vertical direction. Upper and lower sides in FIG. 2 are defined as left and right sides concerning a lateral direction.

Figure 8:
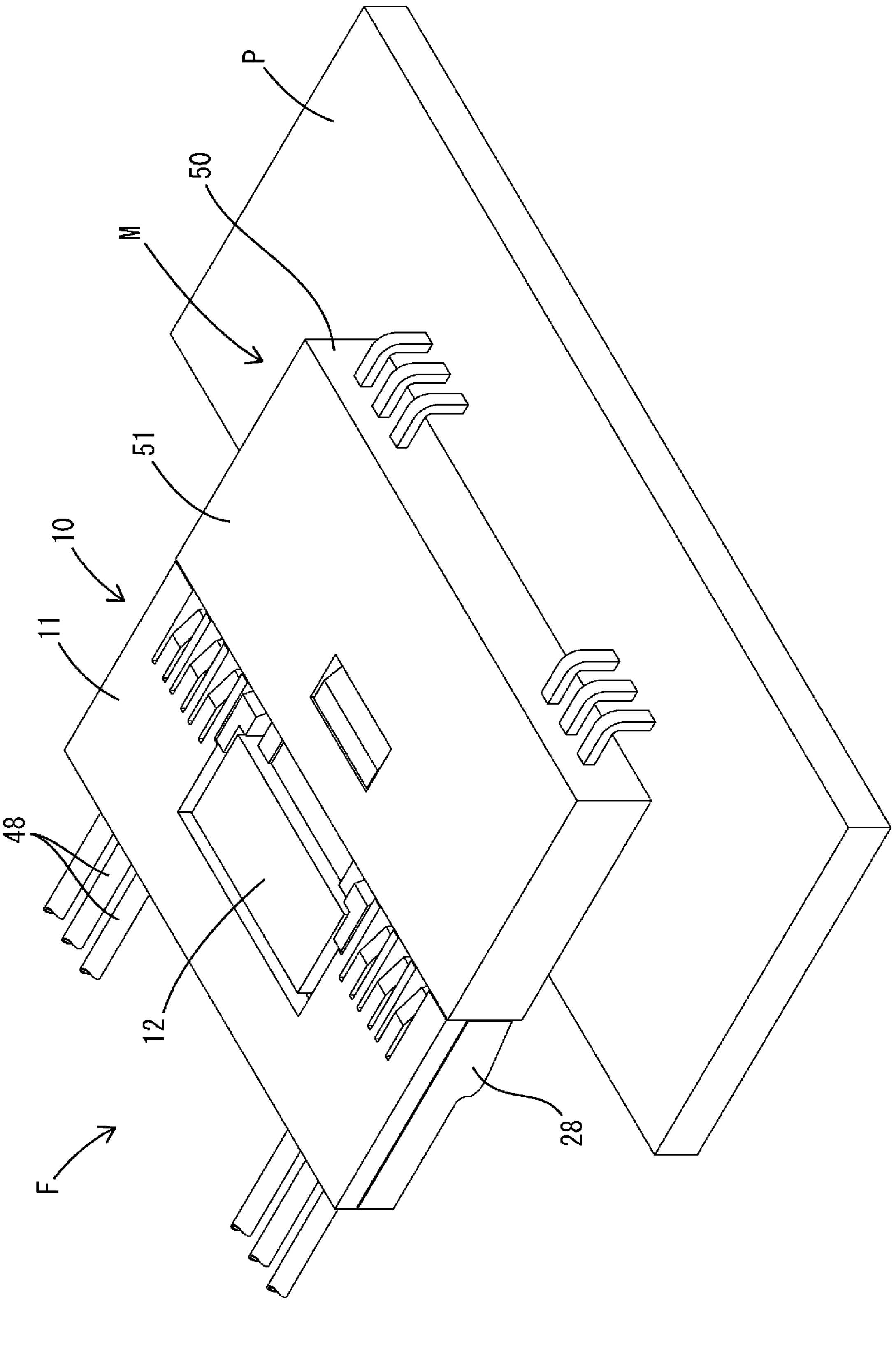
FIG. 8 is a perspective view showing a state where the connector is connected to a mating connector.
Figure 9:
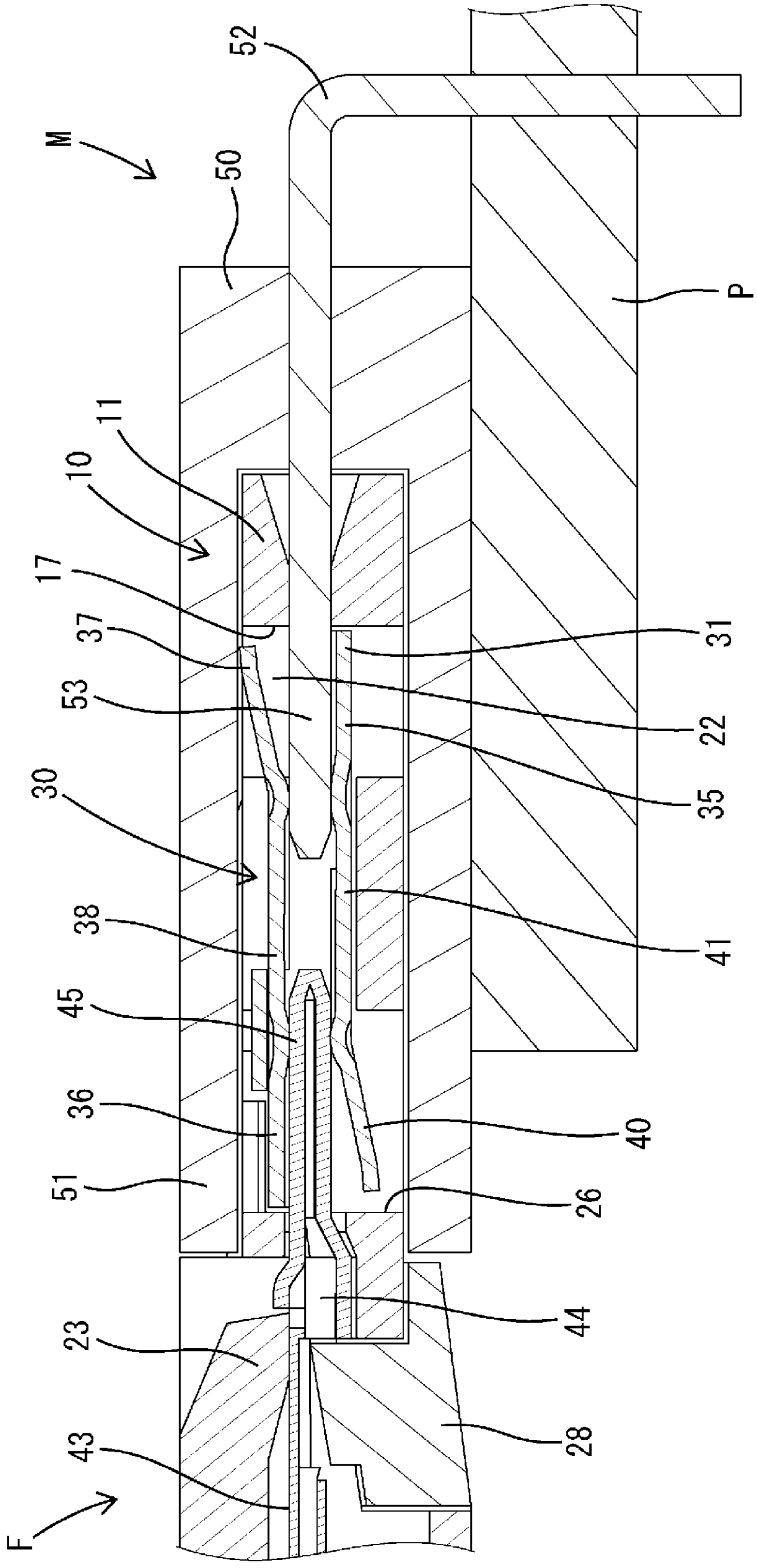
FIG. 9 is a side view in section showing the state where the connector is connected to the mating connector.

The connector F of this embodiment is connected to a mating connector M. As shown in FIGS. 8 and 9, the mating connector M is a board connector to be mounted on a circuit board P, and provided with a mating housing 50 including a receptacle 51 and a plurality of male terminal fittings 52. As shown in FIG. 9, the male terminal fitting 52 is mounted in the mating housing 50 with a tab 53 accommodated in the receptacle 51.

Figure 3:
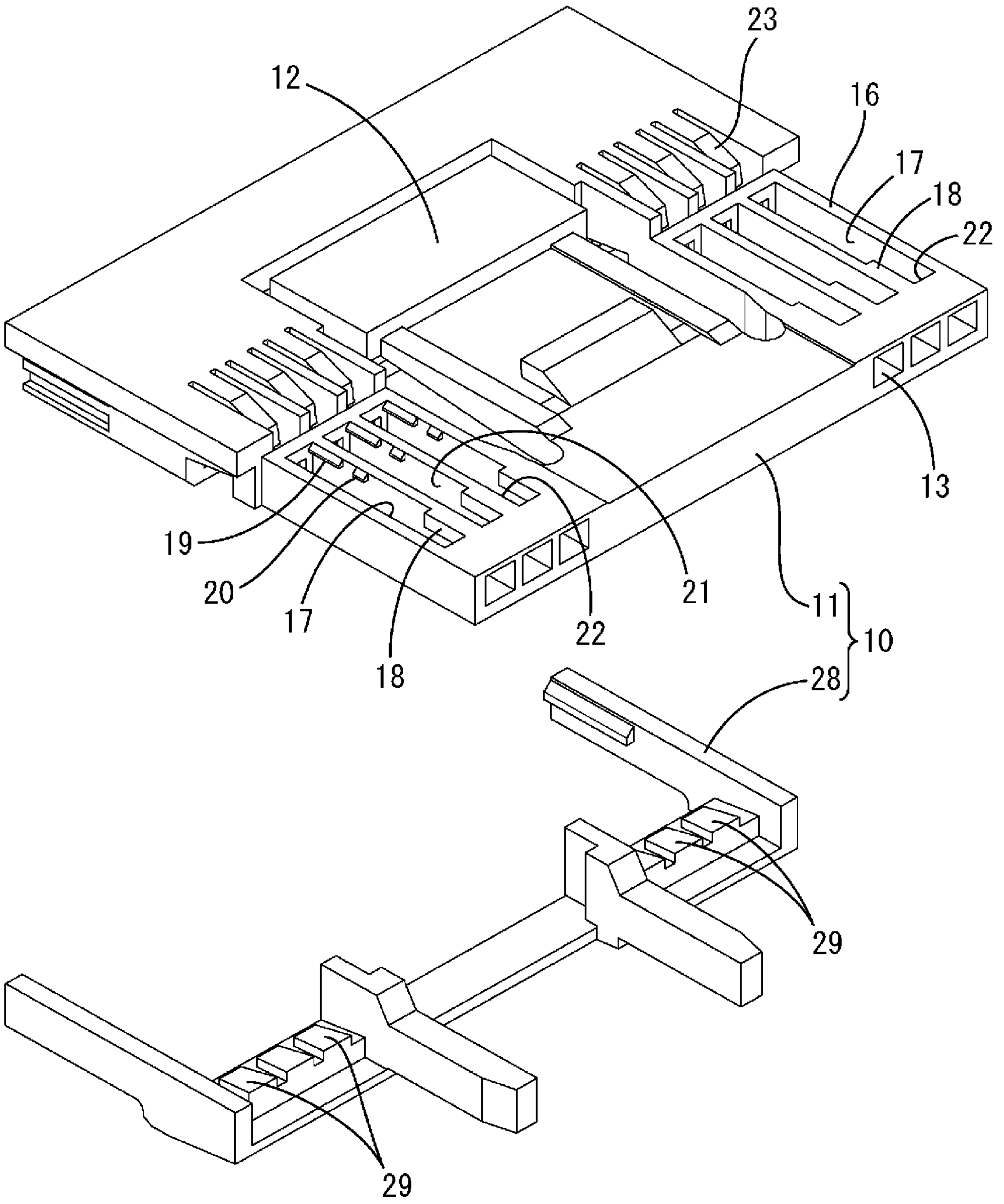
FIG. 3 is an exploded perspective view of a housing.

The connector F is provided with one housing 10 and a plurality of female terminal fittings 30. The housing 10 is configured by assembling a housing body 11 made of synthetic resin and a retainer 28 made of synthetic resin. As shown in FIGS. 1 and 3, the housing body 11 has a flat rectangular parallelepiped shape having a small vertical dimension with respect to dimensions in the front-rear direction and lateral direction as a whole. A lock arm 12 for holding the housing 10 and the mating housing 50 in a connected state is formed in a lateral central part of the housing body 11.

Figure 5:
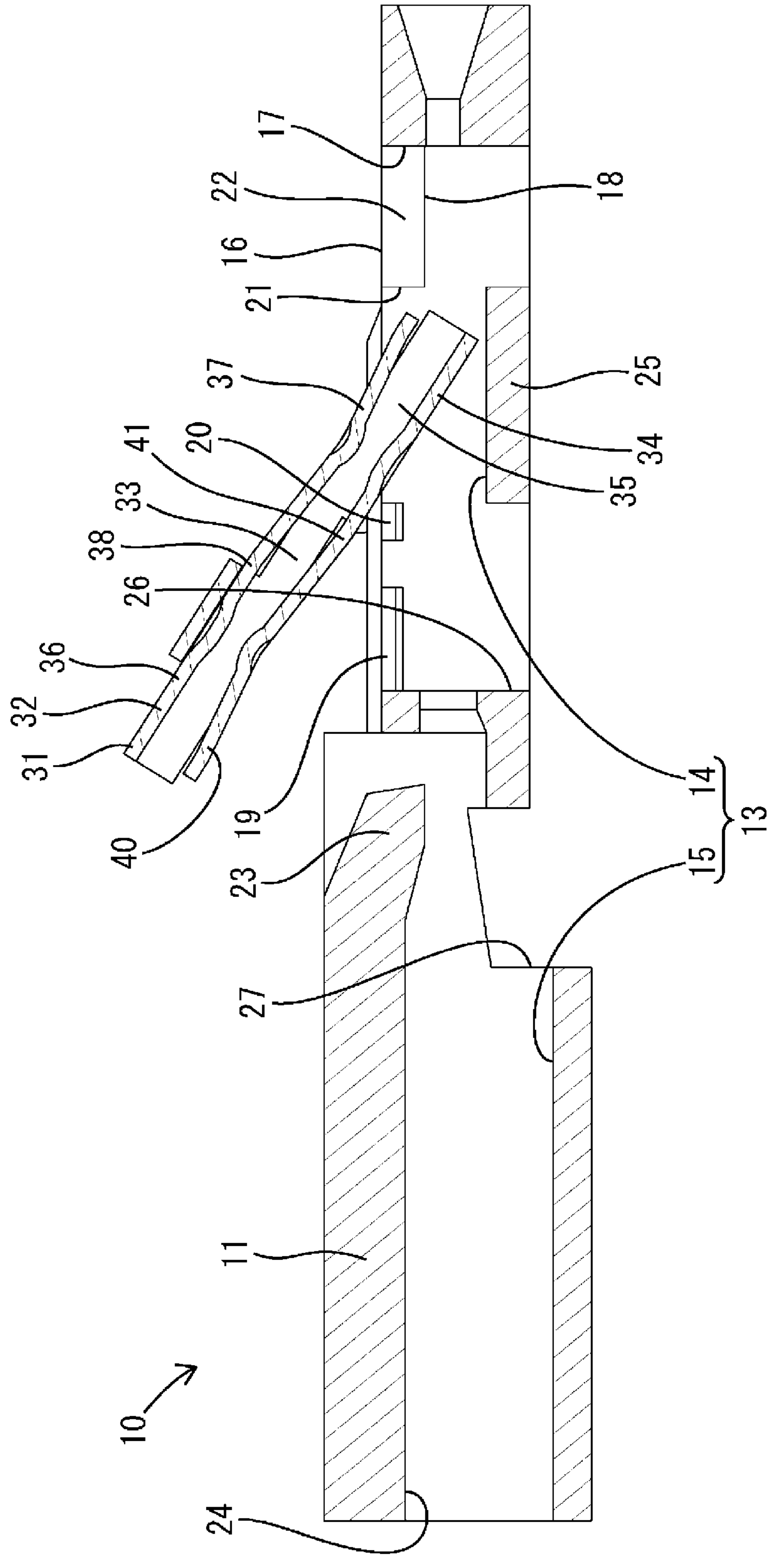
FIG. 5 is a side view in section showing a process of mounting a terminal body of the female terminal fitting into the housing.
Figure 6:
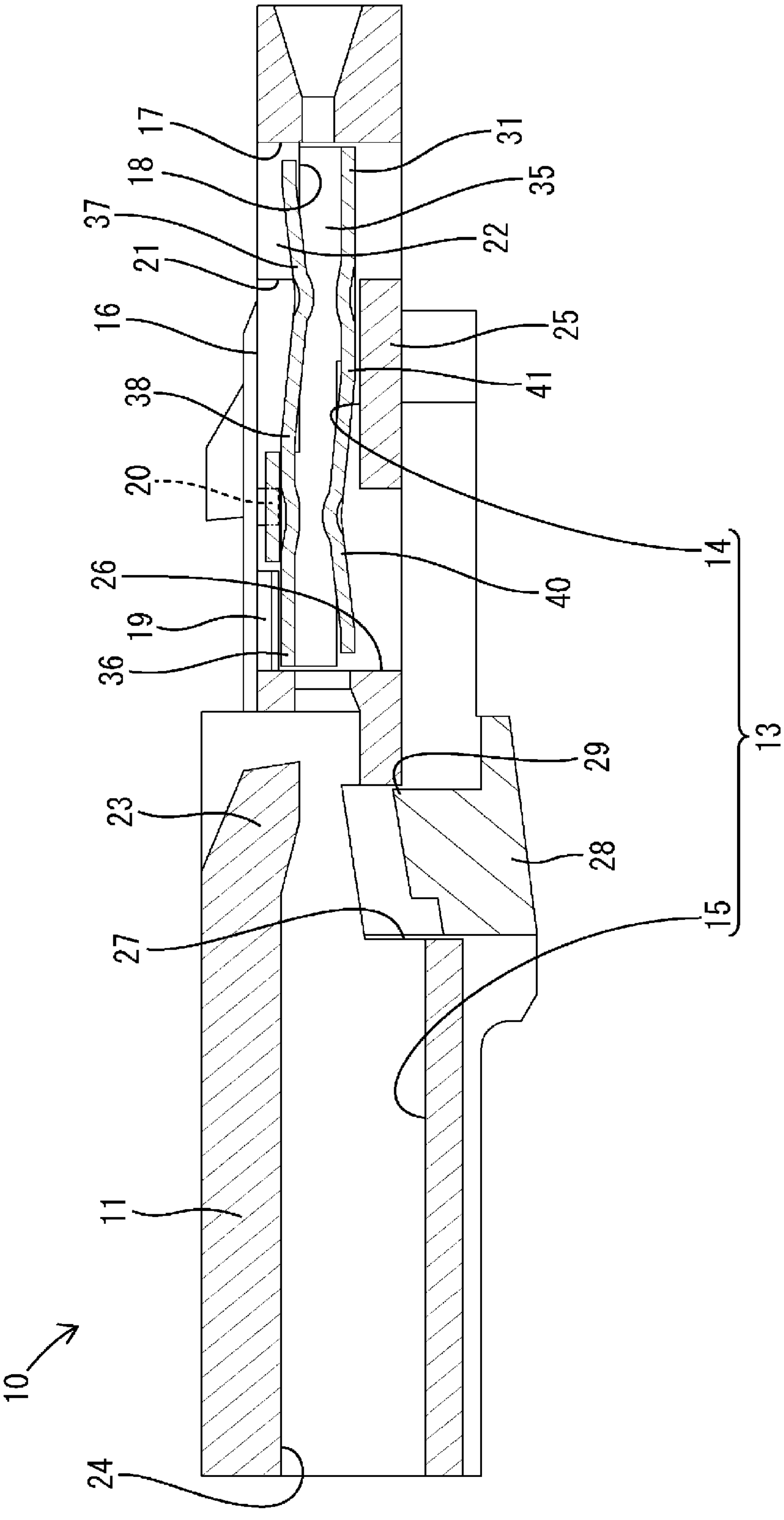
FIG. 6 is a side view in section showing a state where the terminal body is mounted in the housing.
Figure 7:
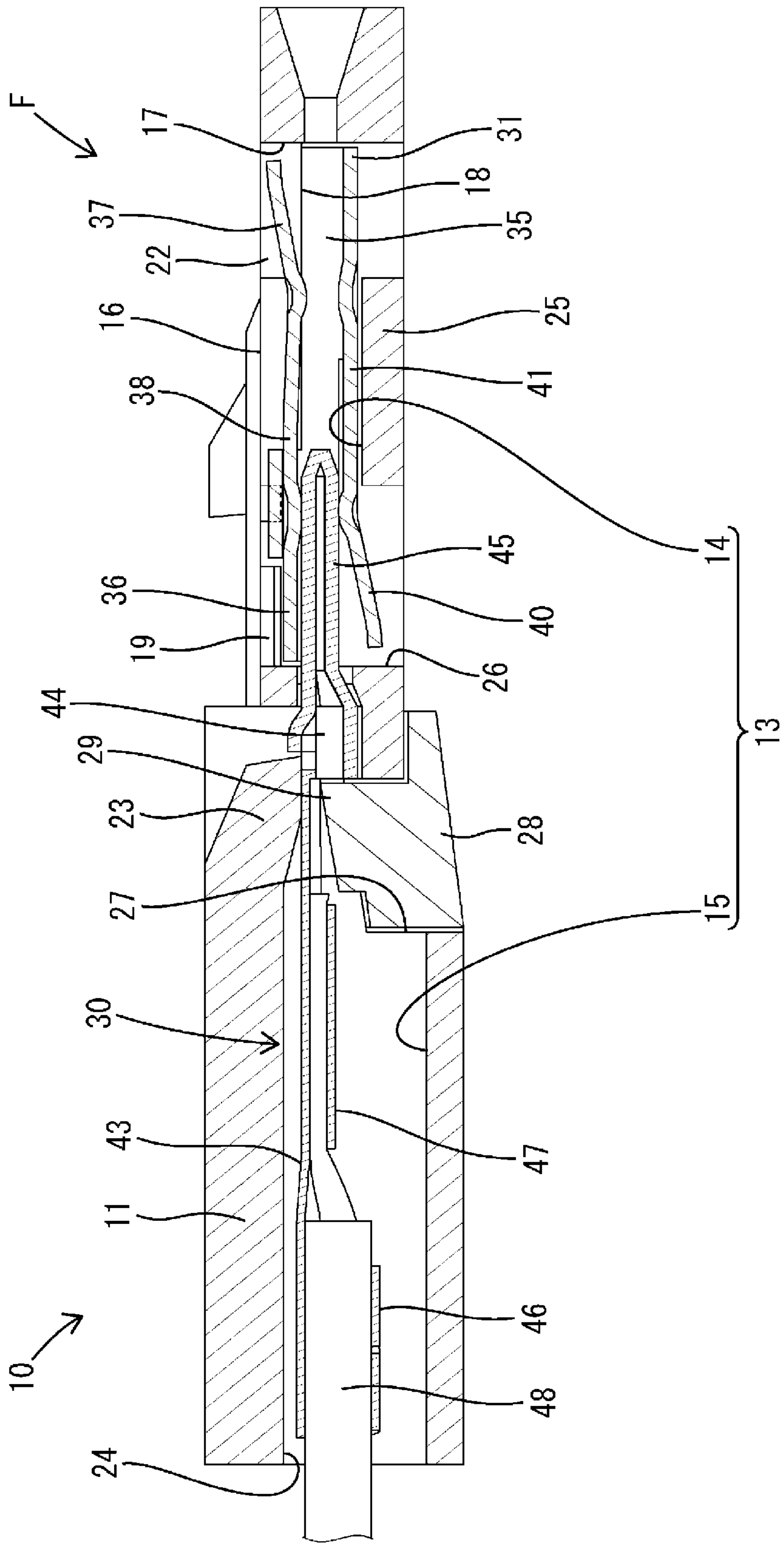
FIG. 7 is a side view in section showing a state where a wire fixing member is mounted in the housing and connected to the terminal body.

A plurality of terminal accommodation chambers 13 arranged in parallel in the lateral direction are formed in regions on both left and right sides of the lock arm 12, out of the housing body 11. As shown in FIGS. 5 to 7, each terminal accommodation chamber 13 is elongated in the front-rear direction and penetrates through the housing body 11 in the front-rear direction. The terminal accommodation chamber 13 is composed of a first accommodation chamber 14 constituting a front end side region of the terminal accommodation chamber 13 and a second accommodation chamber 15 constituting a rear end side region of the terminal accommodation chamber 13.

As shown in FIGS. 1 and 5, an upper wall portion 16 constituting upper surface parts of the terminal accommodation chambers 13, out of the housing body 11, is formed with first mounting openings 17 allowing the first accommodation chambers 14 to be open in the outer surface of the housing body 11. A formation region of the first mounting opening 17 in the front-rear direction is the same range as a formation region of the first accommodation chamber 14 in the front-rear direction. A formation region of the first mounting opening 17 is the same range as a formation region of the first accommodation chamber 14 in the lateral direction.

A first retaining portion 18 projecting from either one of left and right side surfaces in the first mounting opening 17 is formed in a front end part of the first mounting opening 17. The first retaining portion 18 is in the form of a projecting rib elongated in the front-rear direction. In the first mounting opening 17, an opening width (width in the lateral direction) of a region where the first retaining portion 18 is formed, is narrower than that of a region where the first retaining portion 18 is not formed. A second retaining portion 19 projecting from either one of the left and right side surfaces in the second mounting opening 17 is formed in a rear end part of the second mounting opening 17. The second retaining portion 19 is in the form of a projecting rib elongated in the front-rear direction. A third retaining portion 20 projecting from either one of the left and right side surfaces in the mounting opening 17 is formed at a position of the second mounting opening 17 in front of the second retaining portion 19.

A region of the first mounting opening 17 between the rear end of the first retaining portion 18 and the third retaining portion 20 functions as a terminal insertion opening 21 for the insertion of a terminal body 31 of the female terminal fitting 30 into the first accommodation chamber 14. A width in the lateral direction of the terminal insertion opening 21 is larger than the widths of the formation regions of the first and third retaining portions 18 to 20 in the mounting opening 17 and equal to the width of the first accommodation chamber 14.

A front end side region of the first mounting opening 17 functions as a first deflection allowance space 22. The first deflection allowance space 22 communicates with the first accommodation chamber 14 of the terminal accommodation chamber 13 and is open in the upper surface of the housing body 11. The first deflection allowance space 22 is a space for enabling a first resilient contact piece 37 of the female terminal fitting 30 accommodated in the terminal accommodation chamber 13 to be resiliently displaced. As shown in FIGS. 5 to 7, the first deflection allowance space 22 is a space secured within a thickness range of the upper wall portion 16. A formation region of the first deflection allowance space 22 in the front-rear direction is a range from the front end of the first mounting opening 17 to a position between the rear end of the first retaining portion 18 and the third retaining portion 20. A rear end side region of the first deflection allowance space 22 and a front end side region of the terminal insertion opening 21 are a common space.

As shown in FIGS. 1 and 5 to 7, locking lances 23 are formed in a region of the upper wall portion 16 behind the first mounting openings 17. The locking lance 23 is cantilevered forward. The inner surface of the locking lance 23 is facing the inside of the second accommodation chamber 15 of the terminal accommodation chamber 13 and constitutes the upper surface part of the terminal accommodation chamber 13. The outer surface of the locking lance 23 is exposed on the outer surface of the upper wall portion 16 of the housing body 11. The locking lance 23 can be resiliently displaced upward away from the second accommodation chamber 15.

As shown in FIGS. 5 to 7, the rear end of the second accommodation chamber 15 of each terminal accommodation chamber 13 is open as a second mounting opening 24 in the rear end surface of the housing body 11. A lower wall portion 25 constituting lower surface parts of the terminal accommodation chambers 13, out of the housing body 11, is formed with second deflection allowance spaces 26. The second deflection allowance space 26 communicates with a rear end part of the first accommodation chamber 14 and is open in the outer surface of the lower wall portion 25 of the housing body 11. A formation region of the second deflection allowance space 26 in the front-rear direction is only a range behind the rear end of the first deflection allowance space 22.

The lower wall portion 25 of the housing body 11 is formed with an accommodation recess 27 elongated in the lateral direction. The accommodation recess 27 communicates with the plurality of second accommodation chambers 15 and is open in the outer surface of the lower wall portion 25. The retainer 28 mounted into the housing body 11 is accommodated in the accommodation recess 27. The retainer 28 relatively moves in the vertical direction between a temporary locking position (see FIG. 6) and a complete locking position (see FIG. 7) with respect to the housing body 11. With the retainer 28 located at the temporary locking position, locking projections 29 of the retainer 28 are retracted to the outside of the second accommodation chambers 15. If the retainer 28 moves to the complete locking position, the locking projections 29 enter the second accommodation chambers 15.

Figure 4:
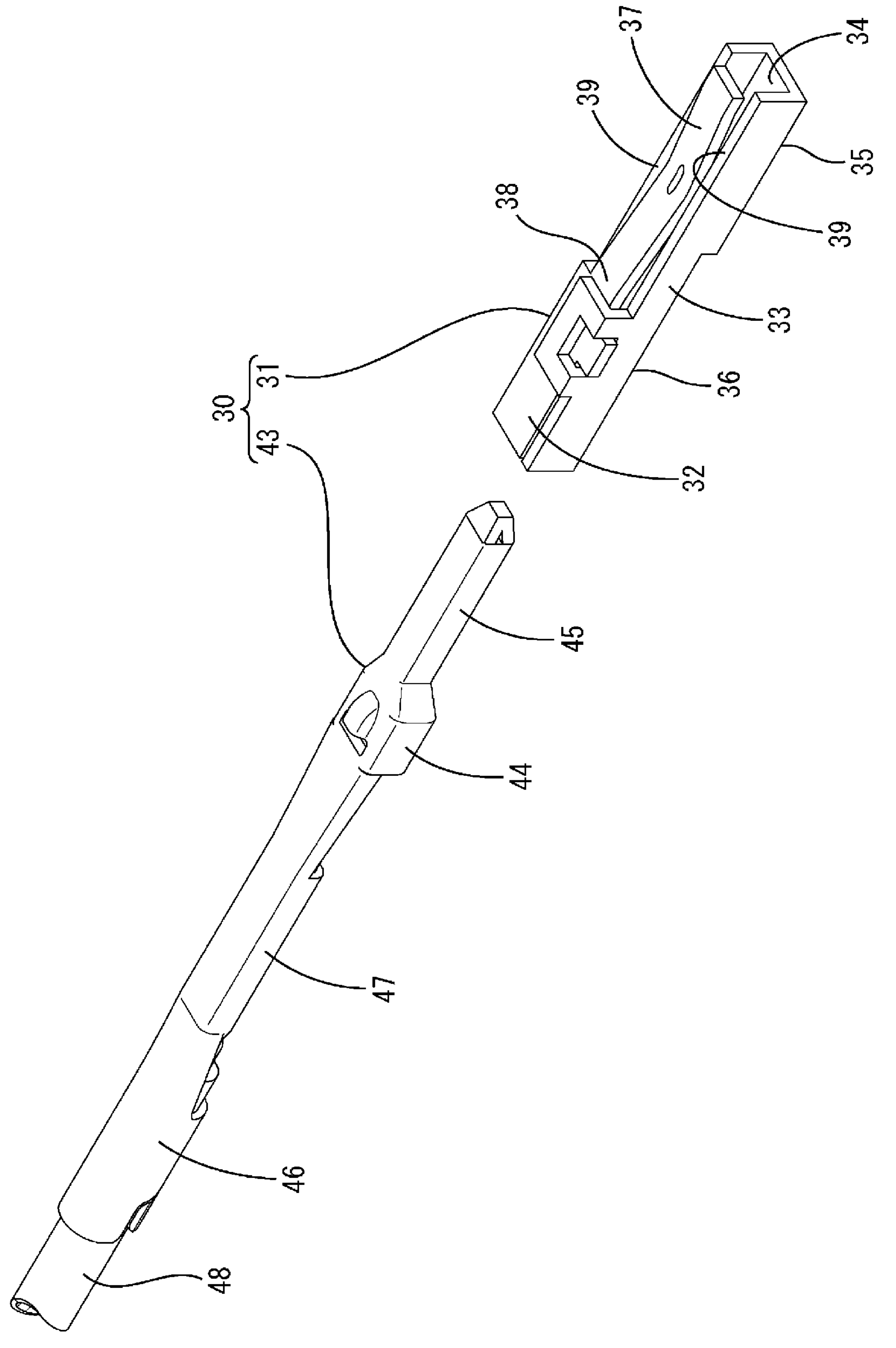
FIG. 4 is an exploded perspective view of a female terminal fitting.

As shown in FIGS. 4 and 7, the female terminal fitting 30 is configured by connecting the terminal body 31 and a wire fixing member 43, which is a component separate from the terminal body 31. As shown in FIG. 4, the terminal body 31 is a single component in the form of a rectangular tube elongated in the front-rear direction as a whole and includes an upper plate portion 32, both left and right side plate portions 33 and a lower plate portion 34. A tab inserting portion 35 is constituted by the both left and right side plate portions 33 and the lower plate portion 34 in a front end side region of the terminal body 31. A terminal coupling portion 36 is constituted by the both left and right side plate portions 33 and the upper plate portion 32 in a rear end side region of the terminal body 31.

As shown in FIGS. 4 to 7, the terminal body 31 is formed with the first resilient contact piece 37. The first resilient contact piece 37 resiliently contacts the tab 53 of the male terminal fitting 52 inserted into the tab inserting portion 35 as shown in FIG. 9. The first resilient contact piece 37 constitutes a part of the upper plate portion 32 and is exposed on the upper surface (outer surface) of the tab inserting portion 35. The first resilient contact piece 37 is cantilevered forward and arranged to cover an internal space of the tab inserting portion 35. The first resilient contact piece 37 is resiliently displaceable in the vertical direction with a first fulcrum portion 38 at the rear end of the first resilient contact piece 37 as a fulcrum.

A resilient displacement direction of the first resilient contact piece 37 is a direction intersecting a length direction of the female terminal fitting 30. As shown in FIG. 4, upper edge parts of the both left and right side plate portions 33 are cut along the first resilient contact piece 37 in a region in the front-rear direction where the first resilient contact piece 37 is formed, thereby forming cut portions 39. The cut portions 39 are lower than regions of the side plate portions 33 where the first resilient contact piece 37 is not formed. In the cut portions 39, a part of the first resilient contact piece 37 projects further upward than the both left and right side plate portions 33 of the tab inserting portion 35, i.e. toward an outer surface side of the terminal body 31.

As shown in FIGS. 5 to 7, the terminal body 31 is formed with a second resilient contact piece 40. As shown in FIG. 7, the second resilient contact piece 40 resiliently contacts a tab-like connecting portion 45 of the wire fixing member 43 inserted into the terminal coupling portion 36. The second resilient contact piece 40 constitutes a part of the lower wall portion 34 and is exposed on the lower surface (outer surface) of the terminal coupling portion 36. The second resilient contact piece 40 is cantilevered rearward, contrary to the first resilient contact piece 37. The second resilient contact piece 40 is resiliently displaceable in the vertical direction with a second fulcrum portion 41 on the front end of the second resilient contact piece 40 as a fulcrum.

The upper plate portion 32 formed with the first resilient contact piece 37 and the lower wall portion 34 formed with the second resilient contact piece 40 constitute parts of the terminal body 31 different in a circumferential direction. A rear end side part of the first resilient contact piece 37 and a front end side part of the second resilient contact piece 40 are arranged in the same region in the front-rear direction. The first fulcrum portion 38 is arranged behind the second fulcrum portion 41. An entire length of the terminal body 31 is shorter than the sum of an entire length of the first resilient contact piece 37 and that of the second resilient contact piece 40.

As shown in FIGS. 4 and 7, the wire fixing member 43 is a single component elongated in the front-rear direction as a whole. The wire fixing member 43 includes a base portion 44 having a rectangular cross-section, the tab-like connecting portion 45, a wire crimping portion 46 and a linking portion 47. The tab-like connecting portion 45 projects forward from the base portion 44 and constitutes a front end part of the wire fixing member 43. The wire crimping portion 46 is in the form of an open barrel and crimped to a front end part of a wire 48. The wire crimping portion 46 constitutes a rear end part of the wire fixing member 43. The base portion 44 and the wire crimping portion 46 are coupled by the linking portion 47. The wire 48 extends rearward from the rear end of the wire fixing member 43.

In mounting the female terminal fitting 30 into the housing 10, only the terminal body 31 is first mounted into the terminal accommodation chamber 13. In mounting, the terminal body 31 is slid into the first accommodation chamber 14 from the terminal insertion opening 21 in a state inclined obliquely downward as shown in FIG. 5. With the terminal body 31 accommodated in the first accommodation chamber 14, a front end part of the tab inserting portion 35 is slipped under the first retaining portion 18 and the terminal coupling portion 36 is slipped under the second and third retaining portions 19, 20 as shown in FIG. 6. By the locking of the first to third retaining portions 18 to 20, the terminal body 31 is held in a state accommodated in the first accommodation chamber 14. The first resilient contact piece 37 is located to face the first deflection allowance space 22, and the second resilient contact piece 40 is located to face the second deflection allowance space 26.

The retainer 28 is assembled at the temporary locking position with respect to the housing body 11 before or after an operation of the accommodating the terminal bodies 31 into the first accommodation chambers 14. With the retainer 28 located at the temporary locking position, the wire fixing member 43 is inserted into the second mounting opening 24 from behind the housing body 11 and accommodated into the second accommodation chamber 15. In the process of inserting the wire fixing member 43, the locking lance 23 is resiliently displaced upward. If the wire fixing member 43 is inserted to a proper position as shown in FIG. 7, the locking lance 23 resiliently returns downward and locks the base portion 44. By the locking action of the locking lance 23, the wire fixing member 43 is retained.

With the wire fixing member 43 retained, the tab-like connecting portion 45 is inserted in the terminal coupling portion 36 and resiliently displaces the second resilient contact piece 40 downward. The resiliently displaced second resilient contact piece 40 enters the second deflection allowance space 26. The second deflection allowance space 26 is secured not within a height range of the female terminal fitting 30, but within a thickness range of the lower wall portion 25. Thus, it is not necessary to secure the second deflection allowance space 26 in the female terminal fitting 30, and the female terminal fitting 30 is reduced in height accordingly. The tab-like connecting portion 45 and the second resilient contact piece 40 resiliently contact each other by a resilient restoring force of the second resilient contact piece 40, and the terminal body 31 and the wire fixing member 43 are conductively connected.

In the above way, the mounting of the female terminal fitting 30 into the housing 10 is completed at the same time as the assembling of the female terminal fitting 30 is completed. After the female terminal fittings 30 are mounted into the housing 10, the retainer 28 is pushed to the complete locking position to lock the locking projections 29 of the retainer 28 to the rear ends of the base portions 44. By the locking action of the retainer 28 and that of the locking lances 23, the wire fixing members 43 are held in a retained state. If the retainer 28 is moved to the complete locking position, the assembling of the connector F is completed.

The connector F is connected to the mating connector M by being fit into the receptacle 51. If the connector F and the mating connector M are connected, the tab 53 enters the tab inserting portion 35 and resiliently displaces the first resilient contact piece 37 upward as shown in FIG. 9. The resiliently displaced first resilient contact piece 37 enters the first deflection allowance space 22. The first deflection allowance space 22 is secured not within the height range of the female terminal fitting 30, but within the thickness range of the upper wall portion 16. Thus, it is not necessary to secure the first deflection allowance space 22 in the female terminal fitting 30, and the female terminal fitting 30 is reduced in height accordingly. The tab 53 and the first resilient contact piece 37 resiliently contact each other by a resilient restoring force of the first resilient contact piece 37 and the female terminal fitting 30 and the male terminal fitting 52 are conductively connected.

The connector F of this embodiment is provided with the female terminal fittings 30 and the housing 10. The female terminal fitting 30 includes the tab inserting portion 35, into which the tab 53 of the male terminal fitting 52 is inserted, and the first resilient contact piece 37. The first resilient contact piece 37 is exposed on the outer surface of the tab inserting portion 35, and resiliently contacts the tab 53. The housing 10 includes the terminal accommodation chambers 13 for accommodating the tab inserting portions 35. The first deflection allowance space 22 for allowing a resilient displacement of the first resilient contact piece 37 is formed within the thickness range of the upper wall portion 16 defining the terminal accommodation chamber 13, out of the housing 10.

If the first resilient contact piece 37 contacts the tab 53 to be resiliently displaced, a part of the first resilient contact piece 37 projecting outwardly of the tab inserting portion 35 due to the resilient displacement is accommodated in the first deflection allowance space 22. The first deflection allowance space 22 is formed within the thickness range of the upper wall portion 16 constituting the terminal accommodation chamber 13. Therefore, the connector F of this embodiment can be reduced in height in the resilient displacement direction of the first resilient contact pieces 37 as compared to the case where dedicated spaces serving as first deflection allowance spaces are secured only inside female terminal fittings.

In a state where the tab 53 is not inserted in the tab inserting portion 35 as shown in FIG. 6, the first fulcrum portion 38 and the front end part, which are parts of the first resilient contact piece 37, are accommodated in the first deflection allowance space 22. According to this configuration, the tab inserting portion 35 and the first accommodation chamber 14 for accommodating the tab inserting portion 35 can be reduced in height. A function of retaining the female terminal fitting 30 is improved by increasing the thickness of the first retaining portion 18 facing the first accommodation chamber 14 as the first accommodation chamber 14 is reduced in height.

Since the first deflection allowance spaces 22 are open in the outer surface of the housing 10 in the connector F of this embodiment, the housing 10 can be reduced in height as compared to the case where deflection allowance spaces are not open in the outer surface of a housing.

The female terminal fitting 30 includes the terminal body 31 formed with the tab inserting portion 35 and the first resilient contact piece 37. The housing 10 is formed with the first mounting opening 17 open in the outer surface of the housing 10 in the upper wall portion 16. The first mounting opening 17 is an opening for enabling the terminal body 31 to enter the terminal accommodation chamber 13. According to this configuration, when the terminal body 31 is mounted into the terminal accommodation chamber 13, the first resilient contact piece 37 projecting toward the outer surface side from the tab inserting portion 35 needs not interfere with the housing 10.

The female terminal fitting 30 includes the wire fixing member 43 fixed to the front end part of the wire 48. The wire fixing member 43 can be mounted into the rear end part of the terminal body 31. The housing 10 is formed with the second mounting opening 24 for enabling the wire fixing member 43 to be inserted into the terminal accommodation chamber 13 from behind the housing 10. According to this configuration, since the wire fixing member 43 is inserted into the terminal accommodation chamber 13 from the second mounting opening 24 different from the first mounting opening 17, the size of the first mounting opening 17 may be such that the terminal body 31 can pass. Therefore, an opening area of the first mounting opening 17 can be suppressed to be small.

The terminal body 31 is formed into a rectangular tube shape by four plate portions, i.e. the upper plate portion 32, the both left and right side plate portions 33 and the lower plate portion 34. The wire fixing member 43 includes the tab-like connecting portion 45 to be inserted into the terminal body 31. The terminal body 31 includes the second resilient contact piece 40 configured to resiliently contact the tab-like connecting portion 45. The first and second resilient contact pieces 37, 40 are individually formed in the upper plate portion 32 and the lower wall portion 34 different from each other, out of the four plate portions 32 to 34. According to this configuration, the entire length of the terminal body 31 can be shortened while lengths in the front-rear direction of the first and second resilient contact pieces 37, 40 are secured as compared to the case where first and second resilient contact pieces are formed in one common plate portion.

Other Embodiments

The present invention is not limited to the above described and illustrated embodiment, but is represented by claims. The present invention is intended to include all changes in the scope of claims and in the meaning and scope of equivalents and also include the following embodiments.

- Although a part of the first resilient contact piece is accommodated in the first deflection allowance space in a state where the tab is not inserted in the tab inserting portion in the above embodiment, the entire first resilient contact piece may be accommodated in the first deflection allowance space in the state where the tab is not inserted in the tab inserting portion.
- Although the terminal body is mounted into the terminal accommodation chamber from a direction intersecting an extending direction of the wire in the above embodiment, the terminal body may be mounted into the terminal accommodation chamber from a direction along the extending direction of the wire.
- Although the female terminal fitting is configured by assembling two components including the terminal body and the wire fixing member in the above embodiment, the female terminal fitting may be a single component.
- Although the first and second resilient contact pieces are formed in the plate portions (upper plate portion and lower plate portion) different from each other in the above embodiment, the first and second resilient contact pieces may be formed in one common plate portion.
- Although the first deflection allowance space is open in the outer surface of the housing in the above embodiment, the first deflection allowance space may not be open in the outer surface of the housing.

LIST OF REFERENCE NUMERALS

F . . . connector
M . . . mating connector
P . . . circuit board
10 . . . housing
11 . . . housing body
12 . . . lock arm
13 . . . terminal accommodation chamber
14 . . . first accommodation chamber
15 . . . second accommodation chamber
16 . . . upper wall portion (wall portion)
17 . . . first mounting opening
18 . . . first retaining portion
19 . . . second retaining portion
20 . . . third retaining portion
21 . . . terminal insertion opening
22 . . . first deflection allowance space (deflection allowance space)
23 . . . locking lance
24 . . . second mounting opening
25 . . . lower wall portion
26 . . . second deflection allowance space
27 . . . accommodation recess
28 . . . retainer
29 . . . locking projection
30 . . . female terminal fitting
31 . . . terminal body
32 . . . upper plate portion (plate portion)
33 . . . side plate portion
34 . . . lower plate portion (plate portion)
35 . . . tab inserting portion
36 . . . terminal coupling portion
37 . . . first resilient contact piece (resilient contact piece)
38 . . . first fulcrum portion
39 . . . cut portion
40 . . . second resilient contact piece
41 . . . second fulcrum portion
43 . . . wire fixing member
44 . . . base portion
45 . . . tab-like connecting portion
46 . . . wire crimping portion
47 . . . linking portion
48 . . . wire
50 . . . mating housing
51 . . . receptacle
52 . . . male terminal fitting
53 . . . tab

What is claimed is:

1. A connector, comprising:
a female terminal fitting; and
a housing,
the female terminal fitting including:
a tab inserting portion, a tab of a male terminal fitting being inserted into the tab inserting portion; and
a resilient contact piece exposed on an outer surface of the tab inserting portion, the resilient contact piece resiliently contacting the tab,
the housing including a terminal accommodation chamber for accommodating the tab inserting portion,
a deflection allowance space for allowing a resilient displacement of the resilient contact piece being formed within a thickness range of a wall portion defining the terminal accommodation chamber, out of the housing, and
a part of the resilient contact piece being accommodated in the deflection allowance space in a state where the tab is not inserted in the tab inserting portion.

2. A connector, comprising:
a female terminal fitting; and
a housing, the female terminal fitting including:

a tab inserting portion, a tab of a male terminal fitting being inserted into the tab inserting portion; and a resilient contact piece exposed on an outer surface of the tab inserting portion, the resilient contact piece resiliently contacting the tab, the housing including a terminal accommodation chamber for accommodating the tab inserting portion, a deflection allowance space for allowing a resilient displacement of the resilient contact piece being formed within a thickness range of a wall portion defining the terminal accommodation chamber, out of the housing, and the deflection allowance space being open in an outer surface of the housing.

3. A connector, comprising:

a female terminal fitting; and a housing, the female terminal fitting including:

a tab inserting portion, a tab of a male terminal fitting being inserted into the tab inserting portion; and a resilient contact piece exposed on an outer surface of the tab inserting portion, the resilient contact piece resiliently contacting the tab, the housing including a terminal accommodation chamber for accommodating the tab inserting portion, a deflection allowance space for allowing a resilient displacement of the resilient contact piece being formed within a thickness range of a wall portion defining the terminal accommodation chamber, out of the housing, the female terminal fitting including a terminal body formed with the tab inserting portion and the resilient contact piece, and the housing being formed with a first mounting opening open in an outer surface of the housing in the wall portion, the first mounting opening enabling the terminal body to enter the terminal accommodation chamber.

4. The connector of claim 3, wherein:

the female terminal fitting includes a wire fixing member to be fixed to a front end part of a wire, the wire fixing member being mountable into a rear end part of the terminal body, and the housing is formed with a second mounting opening for enabling the wire fixing member to be inserted into the terminal accommodation chamber from behind the housing.

5. The connector of claim 4, wherein:

the terminal body is formed into a rectangular tube shape by four plate portions, the wire fixing member includes a tab-like contact portion to be inserted into the terminal body, the terminal body includes a second resilient contact piece configured to resiliently contact the tab-like contact portion, and the resilient contact piece and the second resilient contact piece are individually formed in the plate portions different from each other, out of the four plate portions.

* * * * *